United States Patent

Chen

[11] Patent Number: 5,881,300
[45] Date of Patent: Mar. 9, 1999

[54] METHOD AND SYSTEM FOR SAVING POWER IN A COMPUTER SYSTEM HAVING A COMMUNICATION DEVICE

[75] Inventor: Chenchao Chen, Tokyo, Japan

[73] Assignee: Kabushiki Kaisha Toshiba, Kawasaki, Japan

[21] Appl. No.: 738,782

[22] Filed: Oct. 29, 1996

[30] Foreign Application Priority Data

Feb. 29, 1996 [JP] Japan .................................. 8-042917

[51] Int. Cl.[6] ................................................. G06F 1/32
[52] U.S. Cl. ............................... 395/750.08; 395/750.01; 395/750.03; 395/750.04
[58] Field of Search .............................. 395/750.08, 750, 395/500, 750.03, 750.04, 750.01; 235/441

[56] References Cited

U.S. PATENT DOCUMENTS

| | | | |
|---|---|---|---|
| 4,794,236 | 12/1988 | Kawana et al. ......................... | 235/441 |
| 5,404,494 | 4/1995 | Garney .................................... | 395/500 |
| 5,412,798 | 5/1995 | Garney .................................... | 395/500 |
| 5,546,590 | 8/1996 | Pierce ..................................... | 395/750 |
| 5,652,891 | 7/1997 | Kitamura et al. ....................... | 395/750 |
| 5,787,292 | 7/1998 | Ottesen et al. ..................... | 395/750.01 |

*Primary Examiner*—Meng-Ai T. An
*Assistant Examiner*—Eric S. Thlang
*Attorney, Agent, or Firm*—Finnegan, Henderson, Farabow, Garrett & Dunner, L.L.P.

[57] ABSTRACT

A resource allocation request and a resource release request of a PC card modem sent to a communication driver via a modem driver are hooked by a power saving driver. When the power saving driver detects that the resource allocation request is issued, the power saving driver first begins to supply power to the PC card modem by using a card service. Thereafter, the power saving driver transmits the hooked resource allocation request to the communication driver. Further, when the power saving driver detects that the resource release request is issued, the power saving driver transmits the hooked resource allocation request to the communication driver and stops the supply of power to the PC card modem by using the card service.

11 Claims, 9 Drawing Sheets

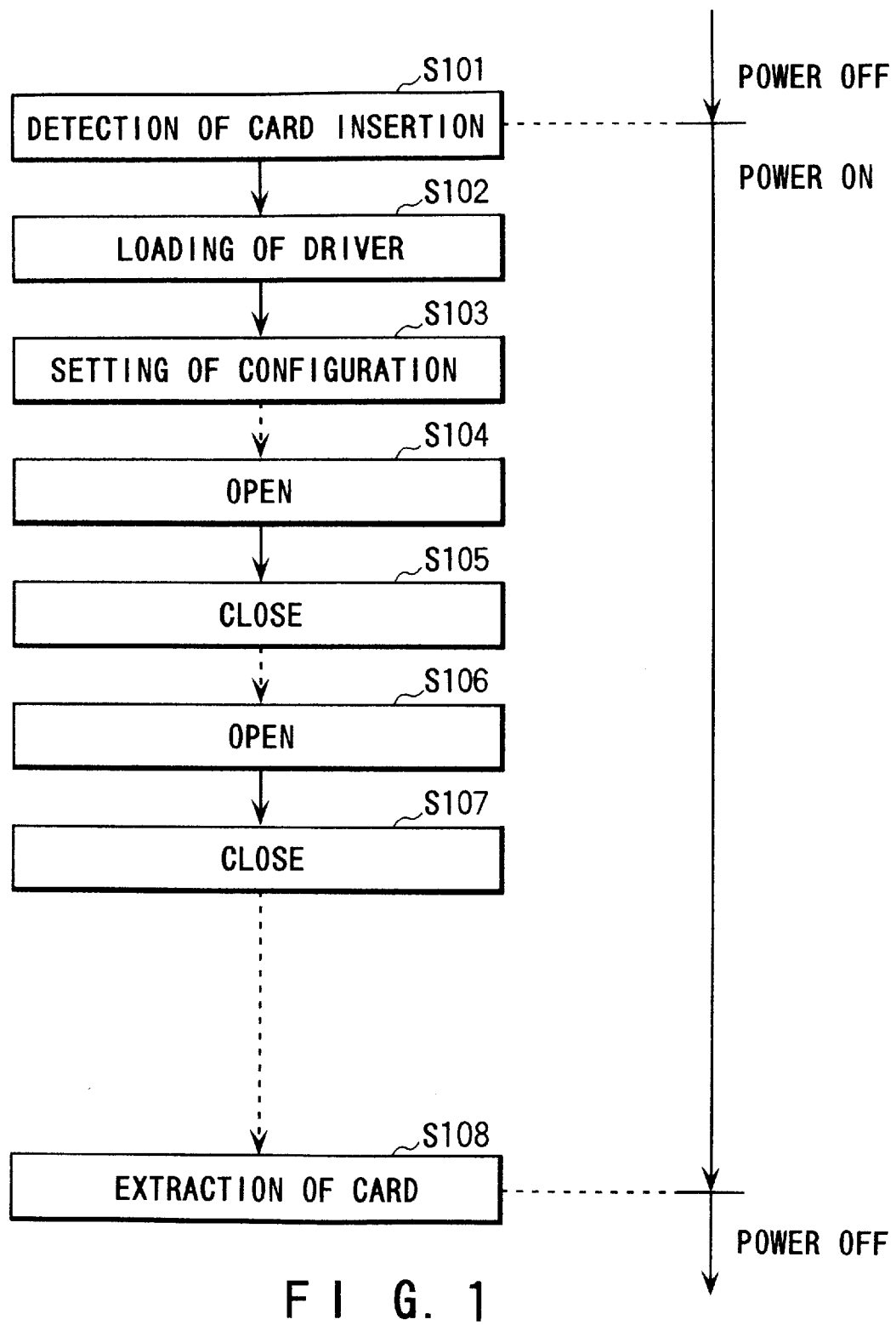
F I G. 1

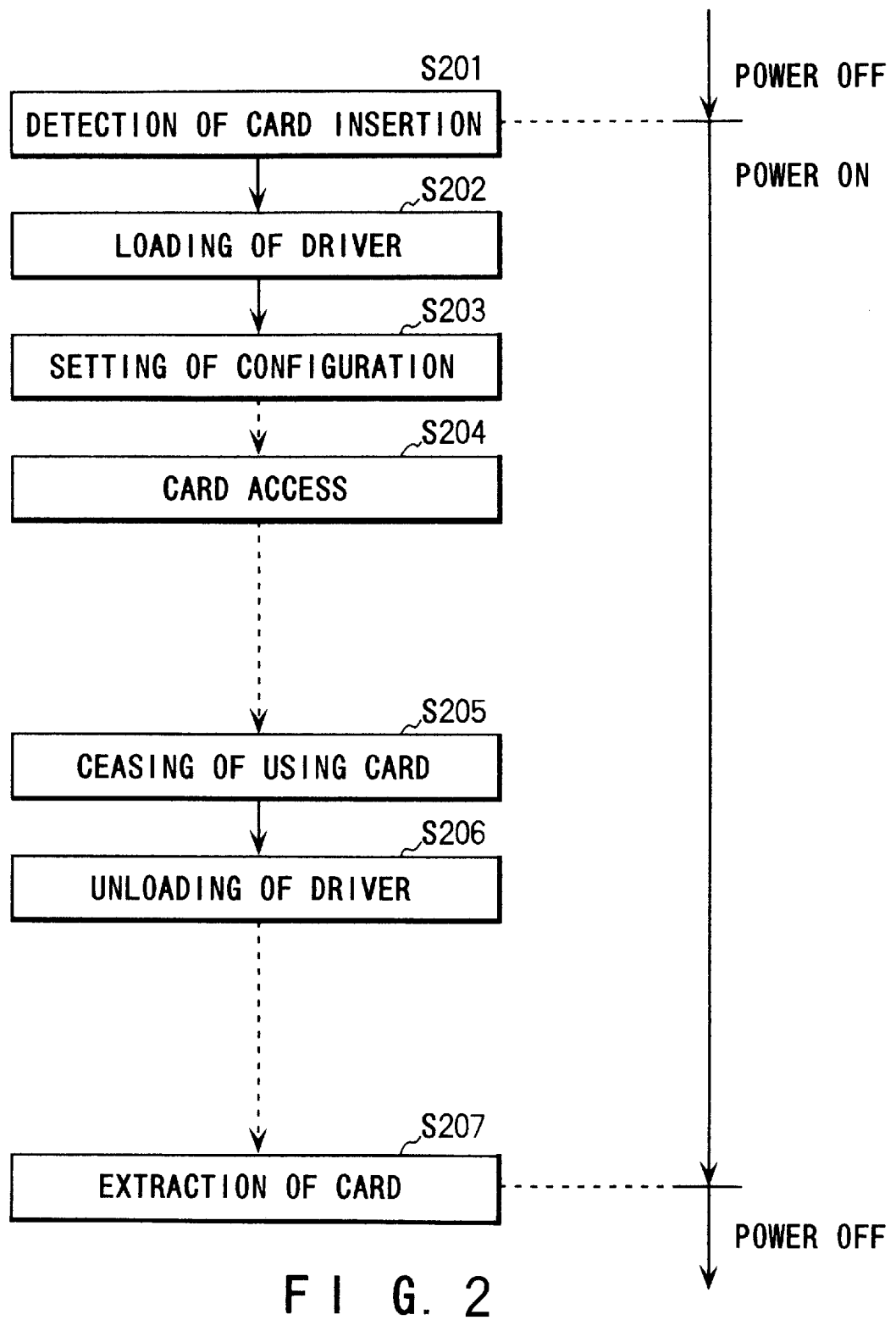
F I G. 2

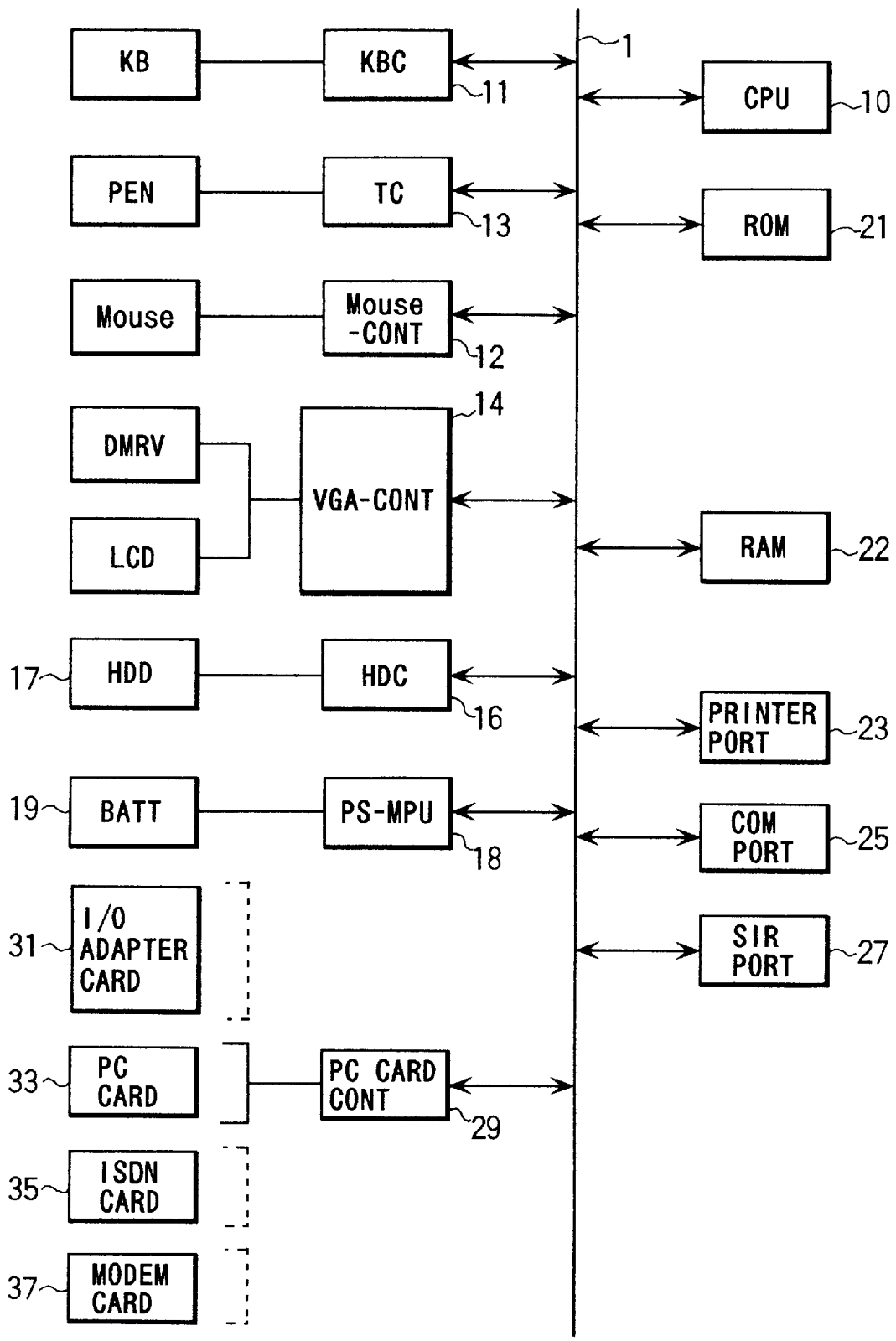
F I G. 3

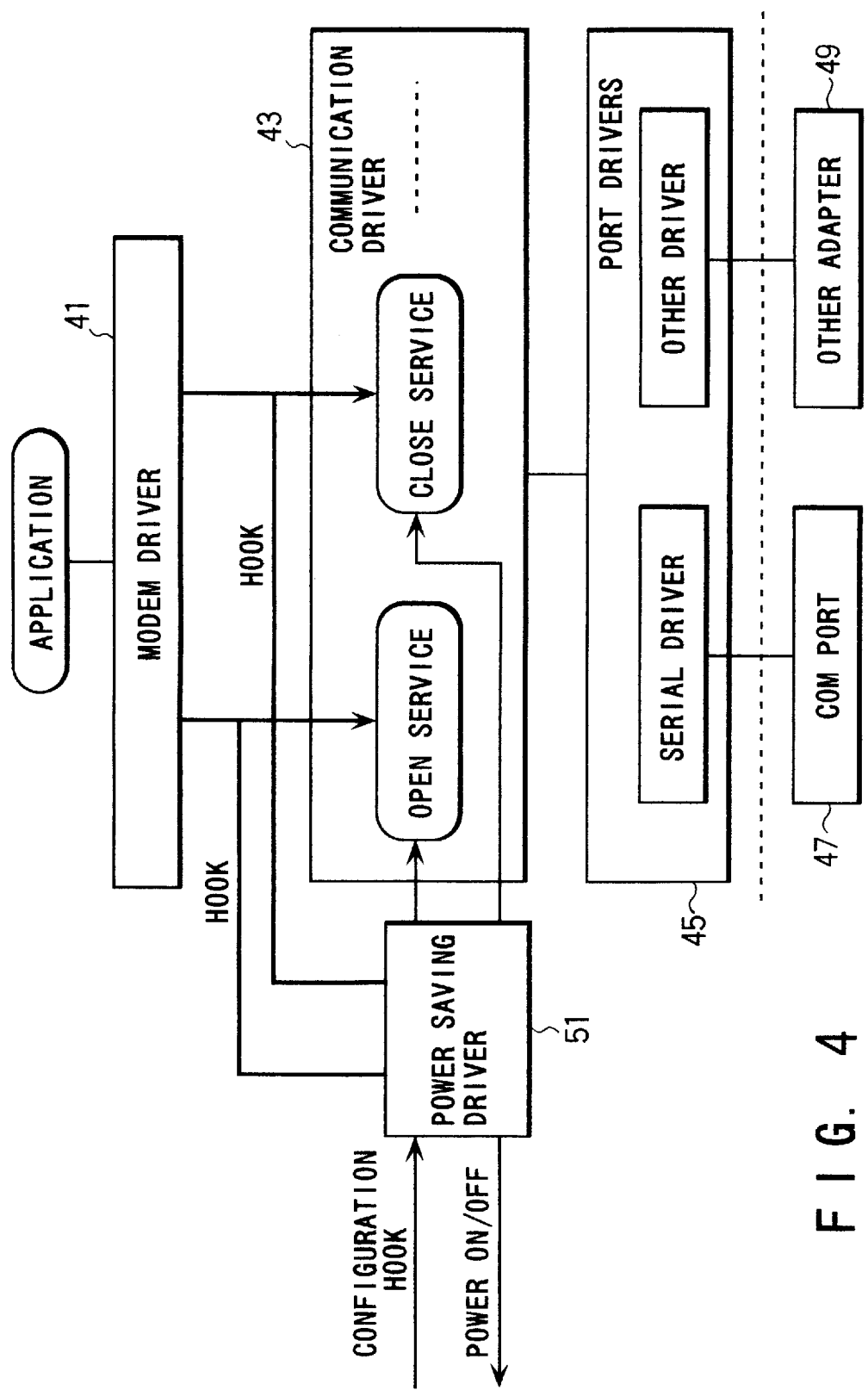
F I G. 4

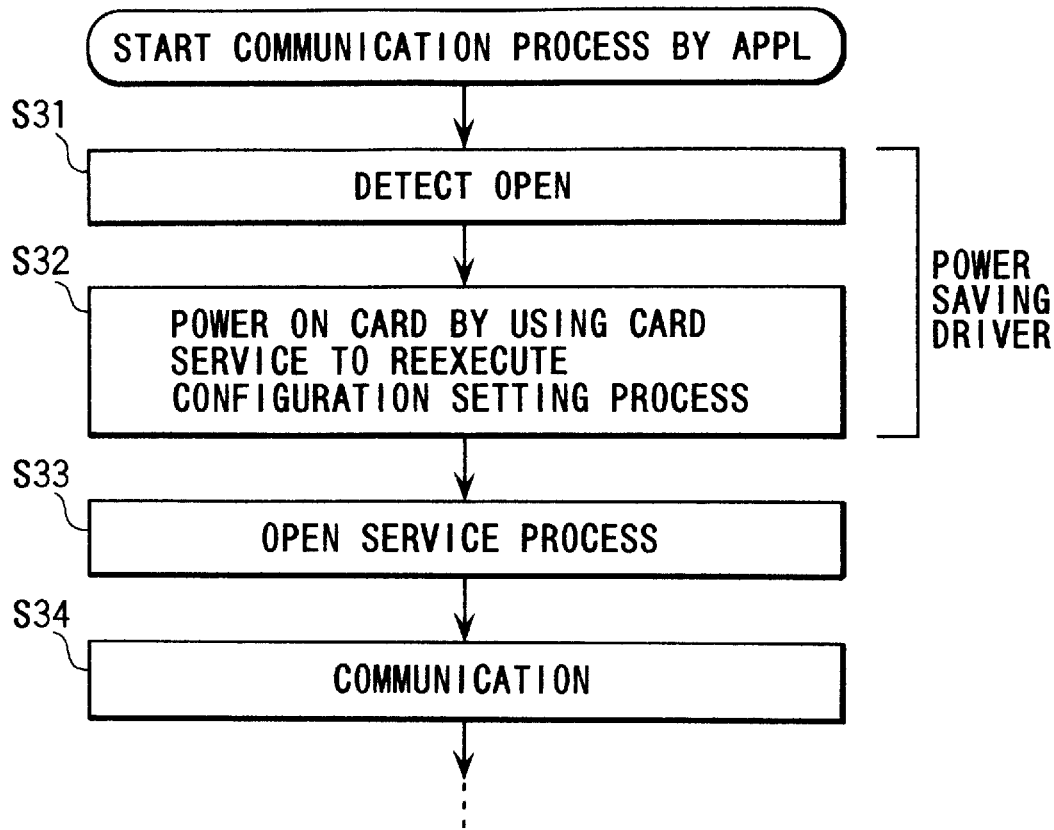
F I G. 6
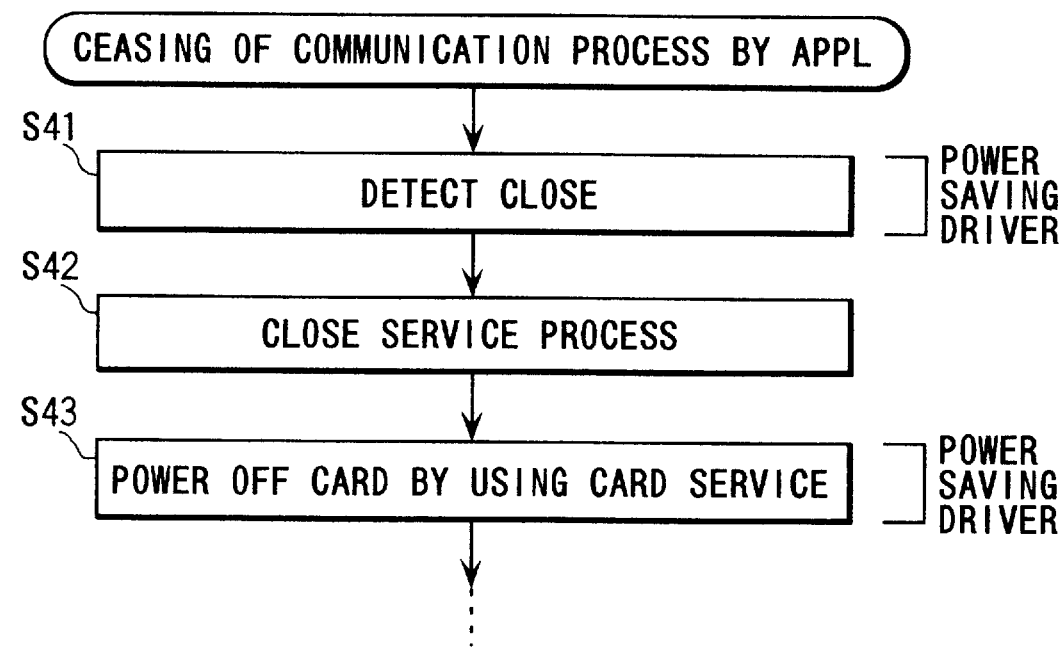
F I G. 7

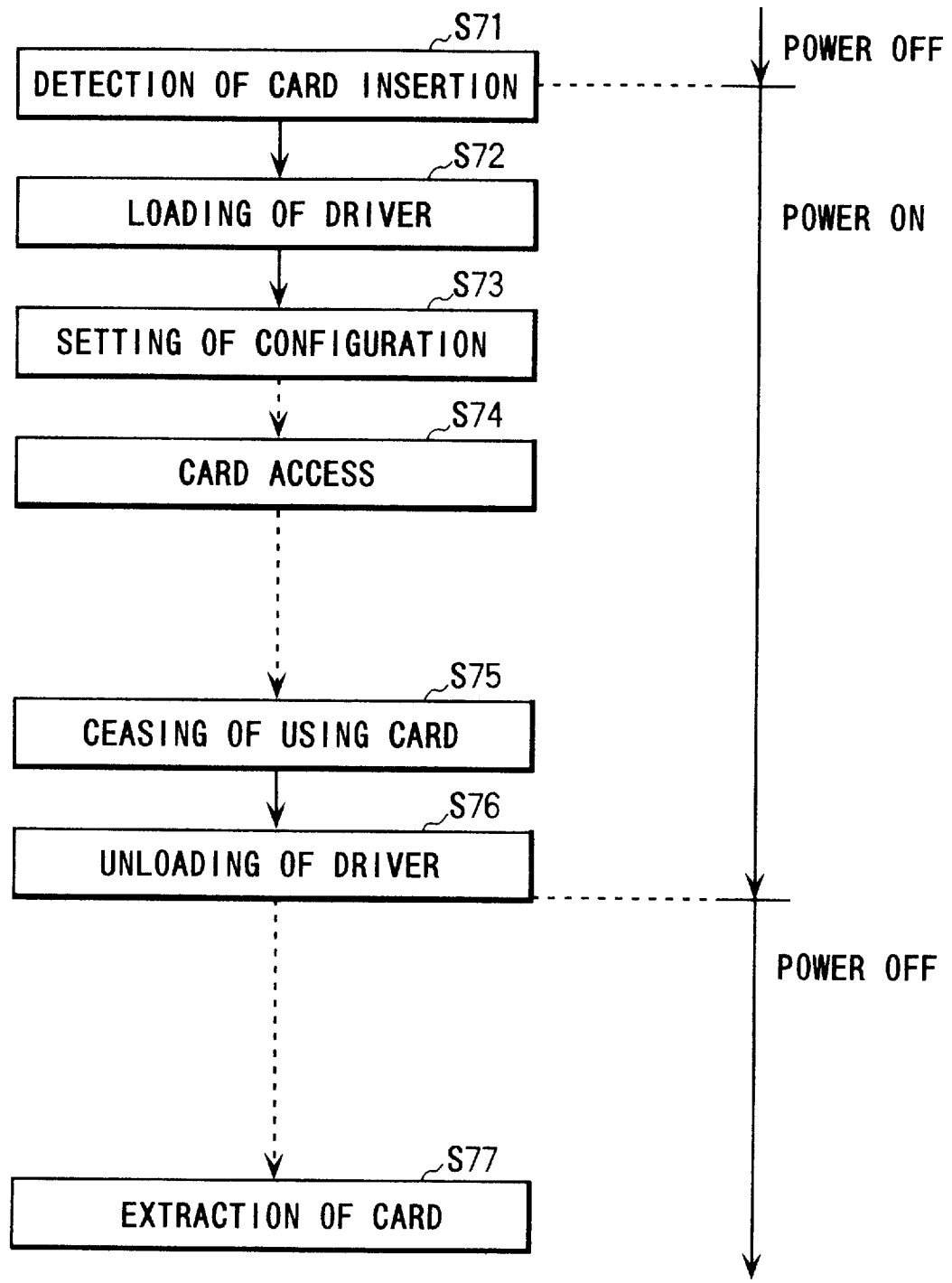
F I G. 11

METHOD AND SYSTEM FOR SAVING POWER IN A COMPUTER SYSTEM HAVING A COMMUNICATION DEVICE

BACKGROUND OF THE INVENTION

1. Field of the Invention

This invention relates to a power saving method of a computer system and particularly relates to a power saving method applied to a computer system in which resource allocation and release requests of a communication device are issued every start and termination of communication processing using the communication device, and a computer system in which a device driver corresponding to a PC card is loaded and unloaded respectively in response to mounting of the PC card and designation of stoppage of use of this PC card.

2. Description of the Related Art

Recently, various kinds of portable computers such as a portable computer, a PDA of a note book type or a subnote type, etc. have been developed. The computers of this kind are used under a mobile computing environment at many opportunities. Therefore, various kinds of power managing functions for reducing power consumption of the computers are set.

However, no sufficient power saving mechanism is arranged with respect to a communication device such as a modem and a peripheral device such as a PC card. Accordingly, there is a problem of uselessly consuming power.

In the following description, a case of use of a PC card modem is illustrated as an example and conventional power management with respect to this PC card modem will be explained.

As shown in FIG. 1, when it is detected (in step S101) that the PC card modem is inserted into a PC card socket of a portable computer, a power source with respect to the PC card modem is turned on so that an electric current flows into the PC card modem through the PC card socket. Next, loading and configuration setting processings (for example, memory locations, the I/O port address and the IREQ number that the PC card uses are set in the registers of the PCMCIA controller) of a device driver corresponding to this PC card modem are performed (in steps S102, S103) and the PC card modem is set to a usable state.

Thereafter, when a resource allocation of the modem is required via a communication control driver from an application program, etc., open processing (a method of resource management such as informing an OS of an application which the PC card is to be used) for allocating the PC card modem to a request source is performed (step S104). Thus, a resource of the PC card modem is acquired by the application program and communication processing using the PC card modem can be executed.

When the communication processing is terminated, a resource release request of the modem is issued via the communication control driver from the application program. Thus, close processing (a processing of returning a handler to the OS) for returning the PC card modem to a computer system is performed (step S105) and the communication processing using the PC card modem is terminated. Thereafter, when the resource allocation of the modem is again required via the communication control driver from the application program, etc., the above-mentioned open processing is performed (step S106). When the communication processing is then terminated, the above-mentioned close processing is performed (step S107).

When it is detected (in step S108) that the PC card modem is detached from the PC card socket, the power source with respect to the PC card modem is turned off.

Thus, the power source of the PC card modem is conventionally turned on continuously during a period from mounting of the PC card modem to the PC card socket to detachment of the PC card modem irrespective of execution of the communication processing using the PC card modem. Accordingly, a useless electric current also flows through the PC card modem for a period in which no PC card modem is used, thereby increasing power consumption.

Power can be saved if a user inserts the card into the card socket only when the user himself uses the PC card modem, and the user pulls the card out of the card socket immediately when the use of the PC card is terminated. However, in reality, it is difficult for the user to compulsorily insert and pull such a card.

Recently, a system for saving a memory has been also developed. In a construction of this system, when the user explicitly designates stoppage of the use of the PC card (for example, the cease of the use of the PC card is selected by clicking an icon indicating the PC card), a device driver corresponding to this PC card is unloaded from the memory.

However, in such a system, a power source of the PC card is also continuously turned on during a period from the mounting of the PC card to the PC card socket to the detachment of the PC card.

Namely, as shown in FIG. 2, when it is detected (in step S201) that the PC card is inserted into the PC card socket of a portable computer, the power source with respect to the PC card is turned on so that an electric current flows into the PC card through the PC card socket. Next, a device driver corresponding to this PC card is loaded and configuration setting processing of the device driver is performed (in steps S202, S203) so that the PC card is set to a usable state. Thereafter, the card is accessed in accordance with an access request from an application program, etc. (step S204). When it is detected that a user explicitly designates stoppage of the use of the PC card, a device driver corresponding to this PC card is unloaded (in steps S205, S206). Then, when it is detected (in step S207) that the PC card is detached from the PC card socket, the power source with respect to this PC card is turned off.

Thus, power is continuously supplied to the PC card as long as the PC card is mounted to the PC card socket. Accordingly, after the use of the PC card is stopped, power is uselessly consumed continuously.

As mentioned above, there is conventionally a problem of uselessly consuming power since no sufficient power saving mechanism is arranged with respect to a communication device such as a modem, etc., and a peripheral device such as a PC card.

SUMMARY OF THE INVENTION

An object of this invention is to provide a power saving method of a computer system in which turning-on and turning-off operations of a power source with respect to a communication device and a PC card can be controlled in accordance with the actual using situations of the communication device and the PC card so that useless power consumption can be efficiently reduced.

According to a first aspect of the present invention, a power saving method to be used in a computer system issuing resource allocation and release requests of a communication device every start and termination of communication processing using the communication device, the method comprising the computer steps of: monitoring the resource allocation and release requests with respect to the communication device; starting the supply of power to the communication device when the resource allocation request is issued; stopping the supply of power to the communication device when the resource release request is issued; and supplying a power to the communication device only for a period in which a resource of the communication device is allocated to a communication request source.

In this power saving method, for example, the resource allocation and release requests with respect to the communication device from an application program, etc. are monitored by using a resident program, etc. Power begins to be supplied to the communication device for the first time when the issue of the resource allocation request is detected by this monitoring. When the communication processing using the communication device is terminated, the resource release request of the communication device from the application program, etc. is issued, but the supply of power to the communication device is stopped at this time. Accordingly, power is supplied to the communication device only for a period in which a resource of the communication device is allocated to a communication request source, i.e., for a period in which the communication processing is performed. Therefore, turning-on and turning-off operations of a power source with respect to the communication device can be controlled in accordance with the actual using situation of the communication device so that useless power consumption can be efficiently reduced.

According to a second aspect of the present invention, a power saving method of a computer system wherein a device driver corresponding to a PC card is loaded and unloaded respectively in response to mounting of the PC card and designation of stoppage of use of the PC card, the method comprising the computer steps of: monitoring the designation of stoppage of use of the PC card to detect whether the use of the PC card is stopped or not; and stopping the supply of power to the PC card when the use of the PC card is stopped.

In this power saving method, when a user, etc. explicitly designate stoppage of the use of the PC card, the device driver corresponding to this PC card is unloaded from a memory and the power supply to the PC card is also stopped. Accordingly, it is possible to prevent power from being continuously supplied to the PC card after the use of the PC card is stopped, thereby saving power.

According to a third aspect of the present invention, an article of manufacture comprises: a computer usable medium having computer readable program code means embodied therein for causing a power of the computer to be saved, the computer issuing resource assignment request and a release request of a communication device for every start and end of a communication process using a communication device, the computer readable program code means in the article of manufacture comprising: a computer readable program code means for causing the computer to monitor the resource assignment request and the release request with respect to the communication device; a computer readable program code means for causing the computer to start supplement of power to the communication device when the resource assignment request is issued; a computer readable program code means for causing the computer to cease supplement of power to the communication device when the resource release request is issued; and a computer readable program code means for causing the computer to cause supplement of power to the communication device only during a period for which the resource of the communication device is assigned to a communication request source.

According to a fourth aspect of the present invention, an article of manufacture comprises: a computer usable medium having computer readable program code means embodied therein for causing a power of the computer to be saved, the computer loading and unloading a device driver corresponding to a PC card in response to an insertion and an instruction for ceasing use of the PC card, the computer readable program code means in the article of manufacture, comprising:

a computer readable program code means for causing the computer to monitor the instruction for ceasing use of the PC card to detect whether or not the use of the PC card is ceased; and a computer readable program code means for causing the computer to cease the supplement of power to the PC card when ceasing use of the PC card is detected.

BRIEF DESCRIPTION OF THE DRAWINGS

FIG. 1 is a flow chart explaining conventional power control processing with respect to the communication card;

FIG. 2 is a flow chart explaining conventional power control processing with respect to a PC card;

FIG. 3 is a system block diagram showing an arrangement of a portable computer to which the present invention is applied;

FIG. 4 is a view showing a communication processing architecture of a computer system to which a power saving method in accordance with a first embodiment of this invention is applied;

FIG. 6 is a flow chart explaining an operation of the computer system at a starting time of the use of a communication card in the first embodiment;

FIG. 7 is a flow chart explaining an operation of the computer system at an ending time of the use of the communication card in the first embodiment;

FIG. 11 is a flow chart explaining a series of power control processings performed from insertion of a communication card into a PC card socket to extraction of the communication card from the PC card socket in the second embodiment.

DETAILED DESCRIPTION OF THE PREFERRED EMBODIMENTS

Figure 5:
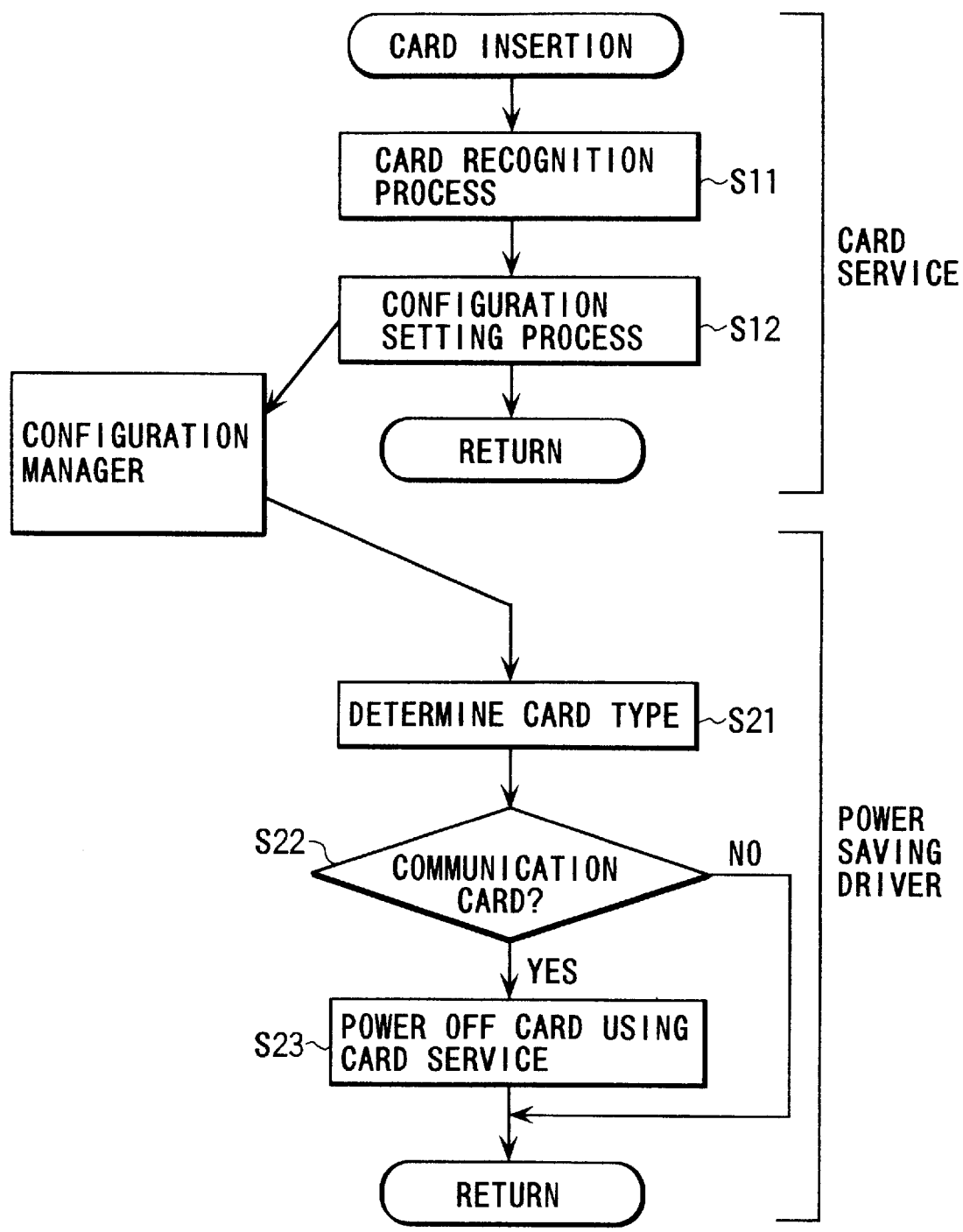
FIG. 5 is a flow chart showing a series of processing flows executed at a card inserting time in the first embodiment.

An embodiment of the present invention will now be described with reference to the drawings.

FIG. 3 is a block diagram showing an arrangement of a portable computer to which the present invention is applied.

In FIG. 3, a system bus 1 is connected to a CPU 10, a ROM 21, a RAM 22, a printer port 23, a COM port 25, a SIR (serial infrared) port 27, a keyboard controller (KBC) 11, a tablet controller (TC) 13, a mouse controller (Mouse- CONT) 12, a VGA controller (VGA-CONT) 14, a hard disk controller (HDC) 16, a power-supply microprocessor (PS-MPU) 18, and a PC card controller 29. The CPU 10 controls the entire system. In this embodiment, the CPU 10 executes programs shown by the flowcharts in FIGS. 5–8 and 10–11 to be loaded from the HDD 17 into the RAM 22 when the system is powered to perform a power-saving control for a communication device.

The KBC 11 controls key inputs of a keyboard (KB). The KBC 11 generates a key-input interrupt when a key on the keyboard is depressed to inform the CPU 10 of the stoppage of use of the PC card.

The Mouse-CONT 12 controls an input of a mouse and informs the CPU of the stoppage of use of the PC card by using an interrupt request caused by a mouse operation (such as a clicking of a button) by a user.

The TC 13 controls a coordinate input to be caused by a pen operation and informs the CPU 10 of the stop-page of use of the PC card by using an input interrupt caused by the pen operation by a user.

The VGA-CONT 14 displays data developed into a video RAM (VRAM) on a display (LCD) under the control of the CPU 10.

The HDC 16 read/write-accesses the HDD 17 under the control of the CPU 10. The HDD 17 stores programs shown by the flowcharts in FIGS. 5–8 and 10–11.

The PS-MPU 18 is a microprocessor controlling a power supply. In this embodiment, the PS-MPU 18 performs ON/OFF control of the power supply, charge/discharge control of a battery 19, and a checking process of a residual capacity of the battery 19.

The battery (BATT) 19 supplies a power to the system when the system is driven by the battery. The charge/discharge control of the BATT 19 and the checking of the battery residual capacity is effected by the PS-MPU 18. The battery residual capacity obtained by the checking process is informed to the CPU 10.

The ROM 21 stores a control program such as a BIOS to be executed by the CPU 10. The RAM 22 is read/write accessed under the control of the CPU 10. When the system is powered, the programs shown by the flowcharts in FIGS. 5–8 and 10–11 stored in the HDD 17 are loaded into the RAM 22.

The PC card controller 29 controls an I/O card adapter 31, a PC card 33, an ISDN card 35, and a modem card 37 and the like.

FIG. 4 shows a communication processing architecture of a computer system to which a power saving method in accordance with a first embodiment of this invention is applied. Here, a case using a PC card modem as a communication device is supposed.

A basic operation of the system of FIG. 4 will first be explained. At a communication starting time, a resource allocation of the PC card modem is required of a communication driver 12 via a modem driver 11 from an application program, etc. Thus, open processing for allocating the PC card modem to a request source is performed by the communication driver 12, and a use right of the PC card modem mounted to the PC card socket is given to the application program. Then, communication processing using the PC card modem is started via a communication port (a serial port, a parallel port) 14 and a communication port driver group 13 for controlling communication of another adapter 15 such as the PC card socket, etc.

When the communication processing is terminated, a resource release request is issued via the modem driver 11 from the application program. Thus, close processing for returning the PC card modem to the system is performed by the communication driver 12, and the communication processing using the PC card modem is terminated.

In the system of FIG. 4, the resource allocation request and the resource release request of the PC card modem sent to the communication driver 12 via the modem driver 11 are hooked by a power saving driver 21 and are sent from the power saving driver 21 to the communication driver 12.

The power saving driver 21 is of a resident ending type program and monitors allocation requests and open requests of all resources for communication sent to the communication driver 12 as a destination at any time. The power saving driver 21 also controls power of the PC card modem in response to the allocation requests and the open requests of these resources.

Namely, when the power saving driver 21 detects that a resource allocation request is issued, the power saving driver 21 first begins to supply power to the PC card modem by using a card service. Thereafter, the power saving driver 21 transmits the hooked resource allocation request to the communication driver 12. Further, when the power saving driver 21 detects that a resource release request is issued, the power saving driver 21 transmits the hooked resource allocation request to the communication driver 12 and stops the supply of power to the PC card modem by using the card service.

Further, the power saving driver 21 monitors existence or nonexistence of the completion of configuration setting processing executed by the card service when the PC card modem is inserted into the PC card socket. The power saving driver 21 also has a function for stopping the supply of power to the PC card modem by using the card service when the power saving driver 21 detects this completion.

Thus, the supply of power to the PC card modem is stopped at a time point at which the PC card modem is initialized to a usable state.

Next, a series of processing flows executed at an inserting time of the PC card will be explained with reference to the flow chart of FIG. 5.

When the PC card is inserted into the PC card socket, this insertion is transmitted to the card service through a socket service. The card service then begins to supply power to the PC card and performs card recognizing processing (step S11). Next, the card service performs an initializing operation so as to use the PC card on the basis of recognized results. When this initializing operation is completed, configuration setting processing is performed with respect to a configuration manager (step S12). Thus, the PC card can be used.

When the power saving driver 21 detects that the configuration setting processing is executed, the power saving driver 21 starts the following processings.

Namely, the power saving driver 21 discriminates a classification of this PC card from configuration information set with respect to the configuration manager (step S21). The power saving driver 21 then checks (in step S22) whether this PC card is a card for communication such as a modem card, an ISDN card, a portable telephone card, etc. When this PC card is a communication card, the power saving driver 21 designates stoppage of the power supply to this PC card to the card service (step S23).

Thus, a power source of the PC card for communication is turned off at a time point at which the initializing operation of the PC card for communication is completed.

Next, an operation of the computer system at a starting time of use of the communication card (e.g., a PC card modem) will be explained with reference to the flow chart of FIG. 6.

At a communication starting time, a resource allocation of the PC card modem is required via the modem driver 11 from an application program, etc. This resource allocation request (open) is not sent to the communication driver, but is hooked by the power saving driver 21. More specifically, a receiving address of the resource allocation request (open) allocated to the communication driver 43 and stored in a table not shown is changed to an address of the power saving driver 51, thereby executing the power saving driver 51. Upon completion of the hook processing, the power saving driver rewrites a return address of the hook processing to the original address of the communication dirver 43.

Thus, when the power saving driver 21 detects the issue of the resource allocation request of the PC card modem (step S31), the power saving driver 21 first turns on a power source of the PC card modem turned off at present by using the card service. Then, similar to the step S12, the configuration setting processing is again executed (step S32). Thereafter, the power saving driver 21 transmits the hooked resource allocation request of the PC card modem to the communication driver 12. Thus, open service processing is executed by the communication driver 12 (step S33). Then, communication processing is started in a normal procedure (step S34).

An operation of the computer system at a terminating time of the communication processing using the PC card modem will next be explained with reference to the flow chart of FIG. 7.

When the communication processing is terminated, a resource release request is issued via the modem driver 11 from an application program. This resource release request (close) is not sent to the communication driver 12, but is hooked by the power saving driver 21. More specifically, a receiving address of the resource release request (close) allocated to the communication driver 43 and stored in the table not shown is changed to an address of the power saving driver 51, thereby executing the power saving driver 51.

Thus, when the power saving driver 21 detects the issue of the resource release request of the PC card modem (step S41), the power saving driver 21 first transmits the hooked resource release request of the PC card modem to the communication driver 12 so that the communication driver 12 executes close service processing (step S42). When this close service processing is terminated, it is returned to control of the power saving driver 21 and the power saving driver 21 turns off the power source of the PC card modem by using the card service (step S43).

Figure 8:
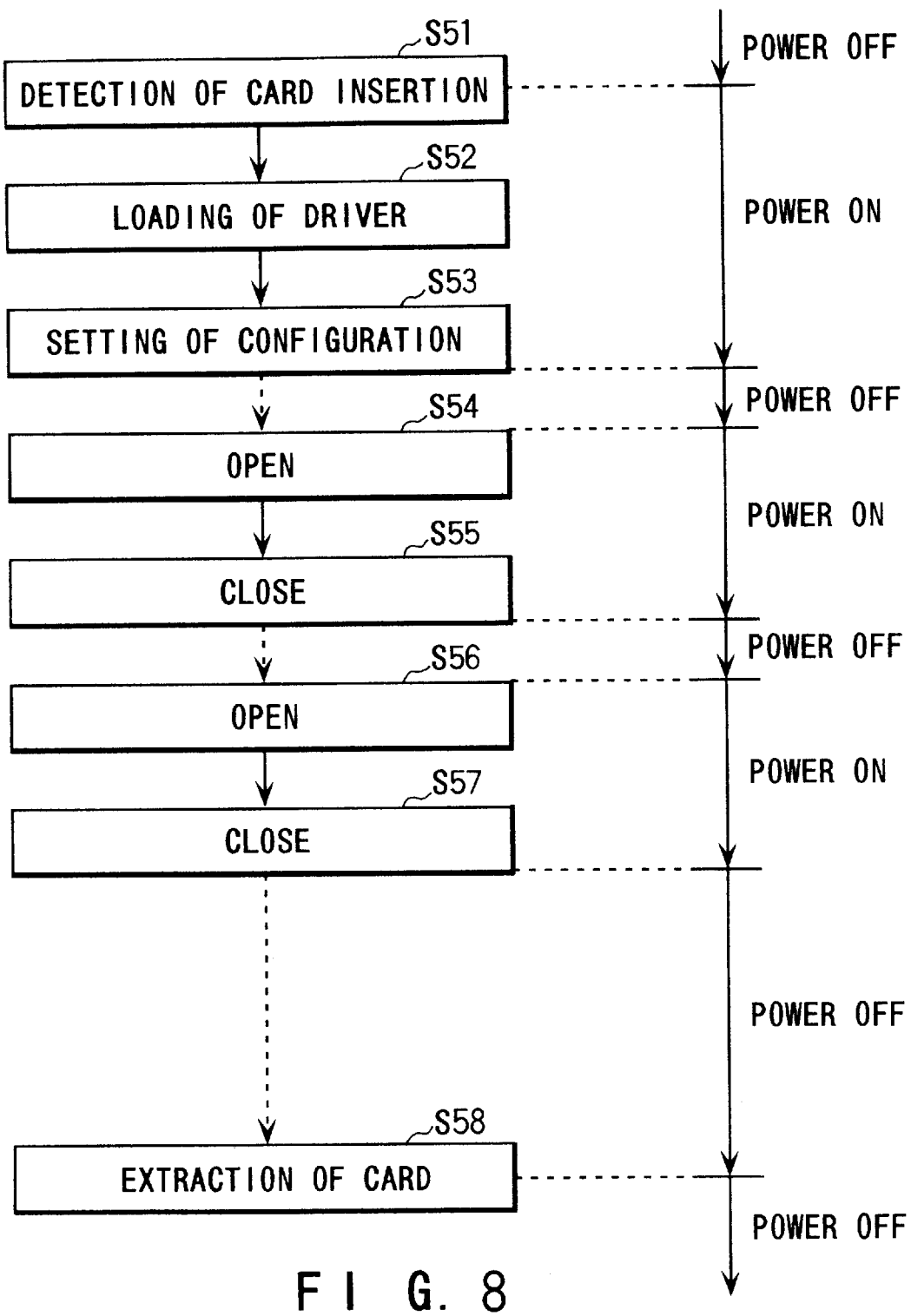
FIG. 8 is a flow chart explaining a series of power control processings performed from insertion of the communication card into a PC card socket to extraction of the communication card from the PC card socket in the first embodiment.

A series of power control processings performed from insertion of the PC card modem into the PC card socket to extraction of this PC card modem from the PC card socket will next be explained with reference to the flow chart of FIG. 8.

When it is detected (in step S51) that the PC card modem is inserted into the PC card socket of a portable computer, the power source with respect to the PC card modem is turned on and an electric current flows into the PC card modem through the PC card socket. Next, a device driver corresponding to this PC card modem is loaded and configuration setting processing of this device driver is performed (steps S52, S53) so that the PC card modem is set to a usable state. Then, the power source of the PC card modem is turned off under control of the power saving driver 21.

Thereafter, when a resource allocation of the modem is required via the modem driver 11 from an application program, etc., the power source of the PC card modem is turned on under the control of the power saving driver 21. Then, open processing for allocating the PC card modem to a request source is performed by the communication driver 12 (step S54). Thus, a resource of the PC card modem is acquired by the application program and the communication processing using the PC card modem can be executed.

When the communication processing is terminated, a resource release request of the modem is issued via the modem driver 11 from the application program. Thus, close processing for returning the PC card modem to the system is performed (step S55) so that the communication processing using the PC card modem is terminated. At this time, the power source of the PC card modem is turned off under the control of the power saving driver 21.

Thereafter, when a resource allocation of the modem is again required via the modem driver 11 from an application program, etc., the above-mentioned power turning-on processing and open processing are performed (step S56). When the communication processing is terminated, the above-mentioned close processing and power turning-off processing are performed (step S57). Then, when it is detected (in step S58) that the PC card modem is detached from the PC card socket, no power turning-off processing is performed since the power source of the PC card modem is already turned off at this time.

As mentioned above, in accordance with this first embodiment, the resource allocation and release requests with respect to the PC card modem from an application program, etc. are monitored by using the power saving driver 21. Power begins to be supplied to the PC card modem for the first time when the issue of the resource allocation request is detected by this monitoring. When the communication processing using the PC card modem is terminated, the resource release request from the application program, etc. is issued, but the supply of power to the PC card modem is stopped at this time. Accordingly, power is supplied to the PC card modem only for a period in which a communication resource is allocated to a communication request source, i.e., for a period in which the communication processing is performed. Therefore, turning-on and turning-off operations of the power source with respect to the accordance with the actual using situation of the PC card modem so that useless power consumption can be efficiently reduced.

Such power control can be similarly performed with respect to a serial port 25, an infrared communication port 27, a printer port 23, etc. as well as the PC card for communication (a modem card, an ISDN card, a portable telephone card).

A second embodiment of this invention will next be explained.

Figure 9:
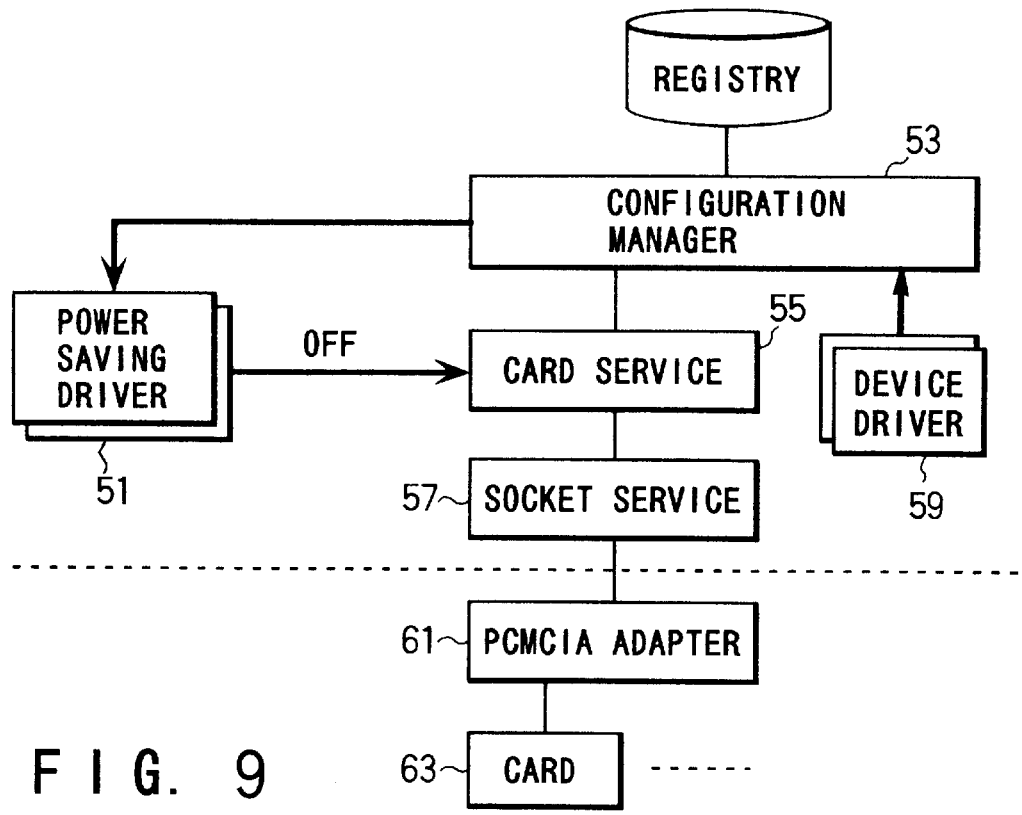
FIG. 9 is a view showing a PC card architecture of a computer system to which a power saving method in accordance with a second embodiment of this invention is applied.

FIG. 9 shows a PC card architecture of a computer system to which a power saving method in accordance with a second embodiment of this invention is applied. Each of constructional elements except for a power saving driver 21 has a normal program function for supporting a card of plug and play correspondence.

Figure 10:
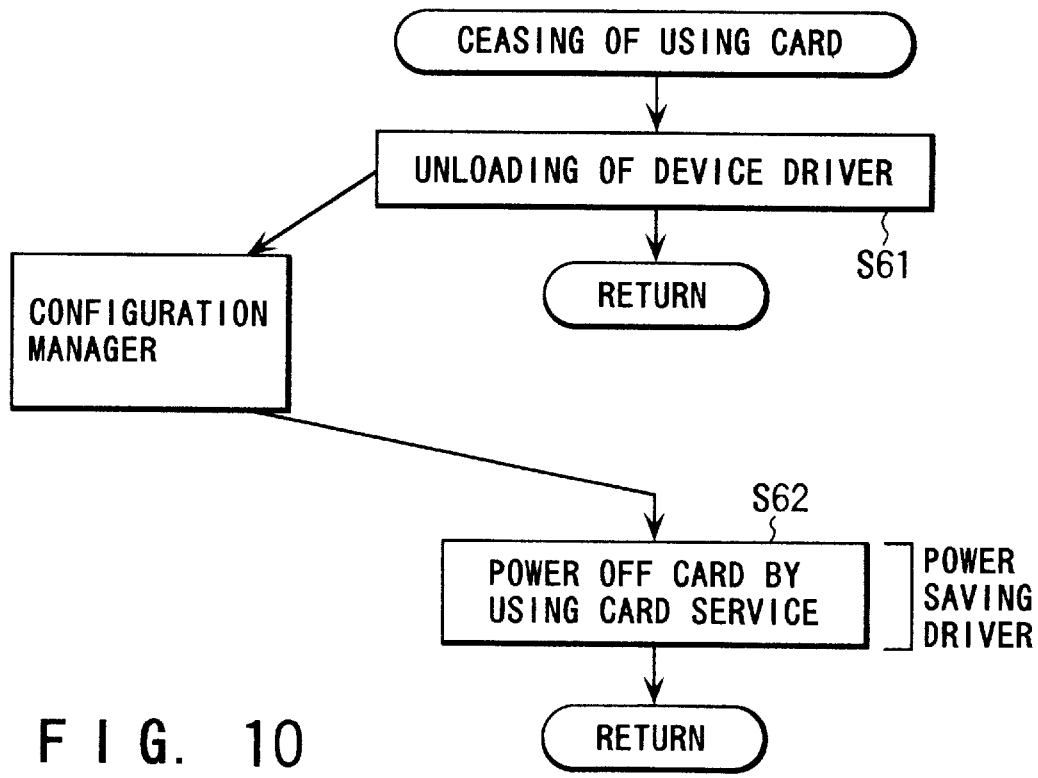
FIG. 10 is a flow chart explaining an operation of the computer system at a stopping time of the use of a card in the second embodiment.

In this system, as shown in the flow chart of FIG. 10, when a user explicitly designates stoppage of the use of a PC card 37 such as clicking the icon indicating the PC card to select the stoppage of use of the PC card, a device driver 35 corresponding to this designation is automatically unloaded from a memory (step S61) and such contents are registered to a configuration manager 32.

A change in setting of configuration caused by the stoppage of the card use is detected by the power saving driver 21. At this time, processing for stopping the power supply to the PC card 37 is performed (step S62).

FIG. 11 shows procedures of a series of power control processings performed from insertion of the PC card 37 except for a communication card into the PC card socket 36 to extraction of the PC card 37 from the PC card socket 36.

When it is detected (in step S71) that the PC card 37 is inserted into the PC card socket 36 of a portable computer, a power source with respect to the PC card 37 is turned on and an electric current flows into the PC card 37 through the PC card socket 36. Next, a device driver 35 corresponding to this PC card 37 is loaded and configuration setting processing of this device driver 35 is performed (steps S72, S73) so that the PC card 37 is set to a usable state. Thereafter, the card is accessed in accordance with an access request from an application program, etc. (step S74). When it is detected that a user explicitly designates stoppage of the use of the PC card 37, the device driver 35 corresponding to this PC card is unloaded (steps S75, S76). At this time, the power source of the PC card 37 is turned off under control of the power saving driver 21. When it is detected (in step S77) that the PC card modem is detached from the PC card socket, no power turning-off processing is performed since the power source of the PC card modem is already turned off.

As mentioned above, in accordance with the second embodiment, when a user, etc. explicitly designate stoppage of the use of the PC card 37, the device driver 35 corresponding to this PC card is unloaded from a memory and the power supply to the PC card 37 is also stopped. Accordingly, it is possible to prevent power from being continuously supplied to the PC card 37 after the use of the PC card 37 is stopped, thereby saving power.

In the above embodiments, a case has been described where the present invention is applied to a communication PC card. However, the present invention is not limited to the above embodiments. The present invention may also be applied to a communication board to be inserted into a slot built in a computer main body as well as to sound cards and boards such as MIDI.

What is claimed is:

1. A power saving method to be used in a computer system issuing resource allocation and release requests of a communication device every start and termination of communication processing using the communication device, the method comprising the computer steps of:

monitoring the resource allocation and release requests with respect to said communication device;

starting the supply of power to said communication device when said resource allocation request is issued;

stopping the supply of power to said communication device when said resource release request is issued; and supplying a power to said communication device only for a period in which a resource of said communication device is allocated to a communication request source.

2. The method according to claim 1, wherein existence or nonexistence of the termination of initial setting processing of said communication device is monitored and the supply of power to said communication device is stopped when the termination of this initial setting processing is detected.

3. A power saving method of a computer system wherein a device driver corresponding to a PC card is loaded and unloaded respectively in response to mounting of the PC card and designation of stoppage of use of the PC card, the method comprising the computer steps of:

monitoring the designation of stoppage of use of said PC card to detect whether the use of said PC card is stopped or not; and stopping the supply of power to said PC card when the use of the PC card is stopped.

4. A power saving method to be used in a computer system having a peripheral unit, the method comprising the steps of:

designating a cease of use of the peripheral unit by a user;

unloading a driver device corresponding to the peripheral unit from a memory;

registering said unloading of the driver device in a configuration manager;

detecting a change in the registering of the configuration manager; and ceasing a supply of power to the peripheral unit in response to said detecting.

5. The method according to claim 4, wherein the peripheral unit is a PC card.

6. The method according to claim 4, wherein the peripheral unit is a communication board.

7. The method according to claim 4, wherein the peripheral unit is a musical instrument digital interface (MIDI) card.

8. A power saving method to be used in a computer system capable of issuing a resource allocation request and a resource release request of a communication device for every start and termination, respectively, of communication processing using the communication device, the method comprising the steps of:

detecting whether a PC card is inserted into a PC card socket;

informing a card service program when it is detected that the PC card has been inserted;

starting a supply of power to the PC card to recognize the PC card;

initializing the PC card based on said recognition;

setting a configuration in a configuration manager in response to said initializing;

detecting said setting of the configuration and determining a type of the PC card; and ceasing the supply of power to the PC card when it is determined that the type of the PC card is a communication card.

9. The method according to claim 8, wherein the PC card is a musical instrument digital interface (MIDI) board.

10. A power saving method to be used in a computer system capable of issuing a resource allocation request and a resource release request of a communication device for every start and termination, respectively, of communication processing using the communication device, the method comprising the steps of:

issuing the resource allocation request;

hooking the resource allocation request;

supplying a power to the communication device and executing a configuration setting process;

notifying a communication driver of the resource allocation request;

starting a communication process;

issuing the resource release request;

hooking the resource release request;

causing the communication driver to execute a close service process; and causing a card service program to cease the supplying of power to the communication device.

11. The method according to claim 10, wherein the communication device is a PC card modem.

* * * * *